(12) United States Patent
Kuroda

(10) Patent No.: US 11,366,201 B2
(45) Date of Patent: Jun. 21, 2022

(54) SENSOR HOUSING DEVICE

(71) Applicant: Sharp Kabushiki Kaisha, Sakai (JP)

(72) Inventor: Tatsuro Kuroda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 503 days.

(21) Appl. No.: 16/081,961

(22) PCT Filed: Dec. 22, 2016

(86) PCT No.: PCT/JP2016/088487
§ 371 (c)(1),
(2) Date: Sep. 4, 2018

(87) PCT Pub. No.: WO2017/119324
PCT Pub. Date: Jul. 13, 2017

(65) Prior Publication Data
US 2020/0355794 A1    Nov. 12, 2020

(30) Foreign Application Priority Data

Jan. 5, 2016 (JP) .............................. JP2016-000428

(51) Int. Cl.
*G01S 7/00* (2006.01)
*G01S 7/481* (2006.01)
*G01D 11/24* (2006.01)

(52) U.S. Cl.
CPC ............ *G01S 7/481* (2013.01); *G01D 11/245* (2013.01)

(58) Field of Classification Search
CPC .............................. G01S 7/481; G01D 11/245
See application file for complete search history.

(56) References Cited

FOREIGN PATENT DOCUMENTS

| DE | 1021004644 A1 | * | 11/2021 | |
| JP | 6-34158 U | | 5/1994 | |
| JP | 6-342071 A | | 12/1994 | |
| JP | 06342071 A | * | 12/1994 | |
| JP | 2009-300390 A | | 12/2009 | |
| JP | 2009300390 A | * | 12/2009 | ............ G01S 7/027 |
| JP | 2014-43809 A | | 3/2014 | |
| JP | 2014-202527 A | | 10/2014 | |

OTHER PUBLICATIONS

Official Communication issued in International Patent Application No. PCT/JP2016/088487, dated Mar. 21, 2017.

* cited by examiner

*Primary Examiner* — Jamel E Williams
(74) *Attorney, Agent, or Firm* — Keating & Bennett, LLP

(57) ABSTRACT

To provide a housing device in which an occurrence frequency of a water droplet dripping from a ceiling portion is reduced. A housing device includes a casing of which at least one surface serves as an opening surface, in which when viewed from the opening surface, in order to convey a liquid flowing from above the opening surface to the depth side, a ceiling surface of the casing is inclined to descend from a front side to a depth side.

16 Claims, 13 Drawing Sheets

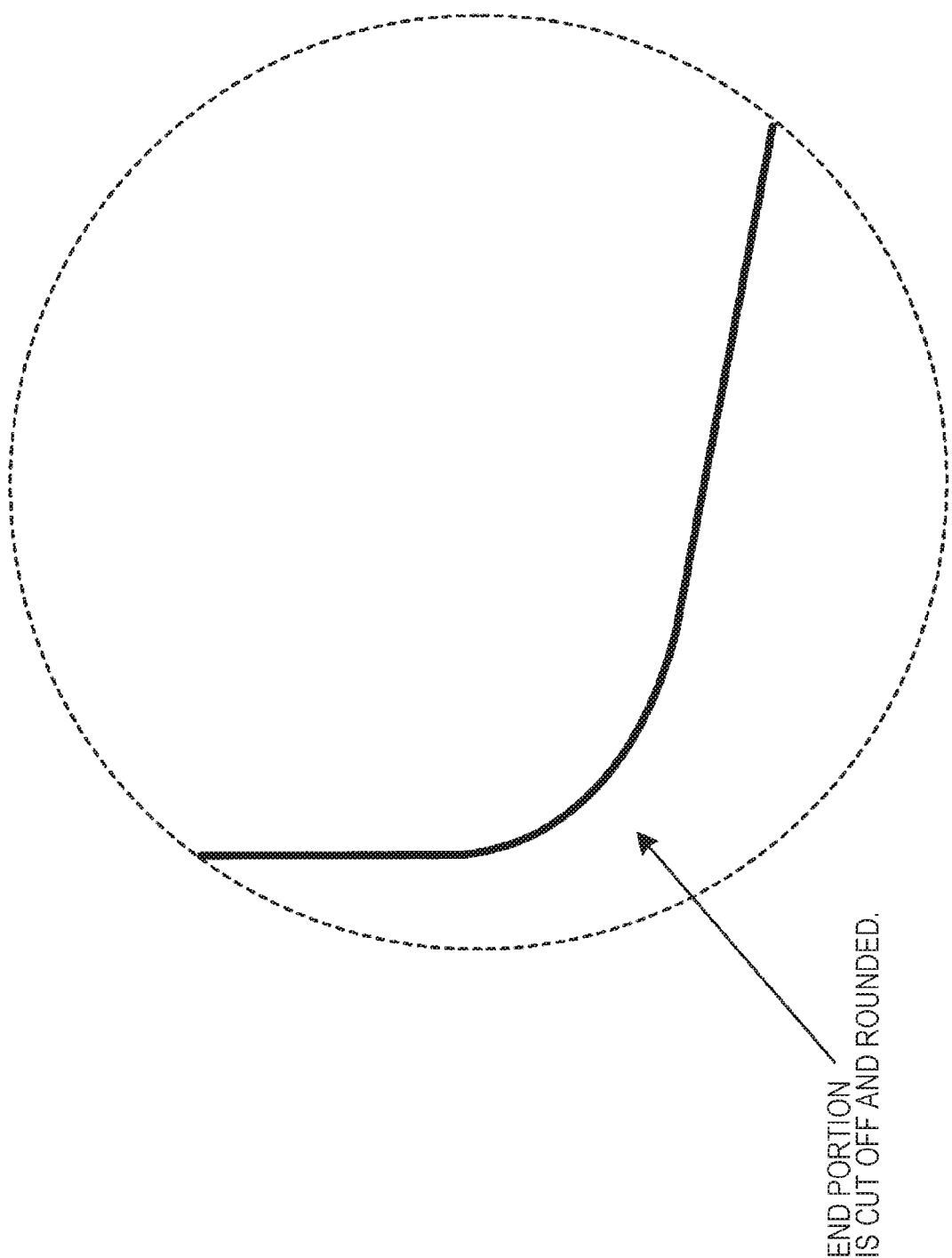

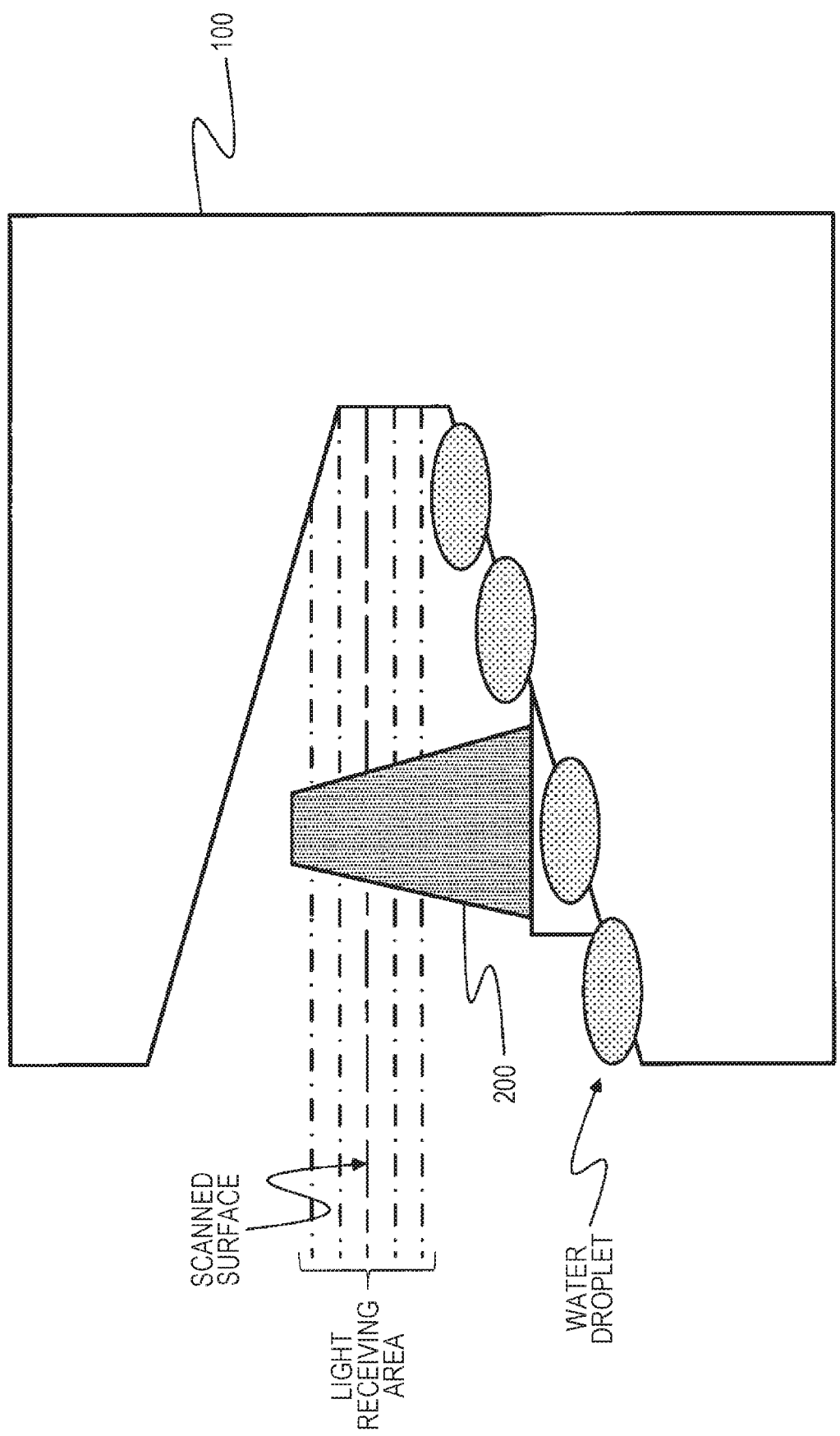

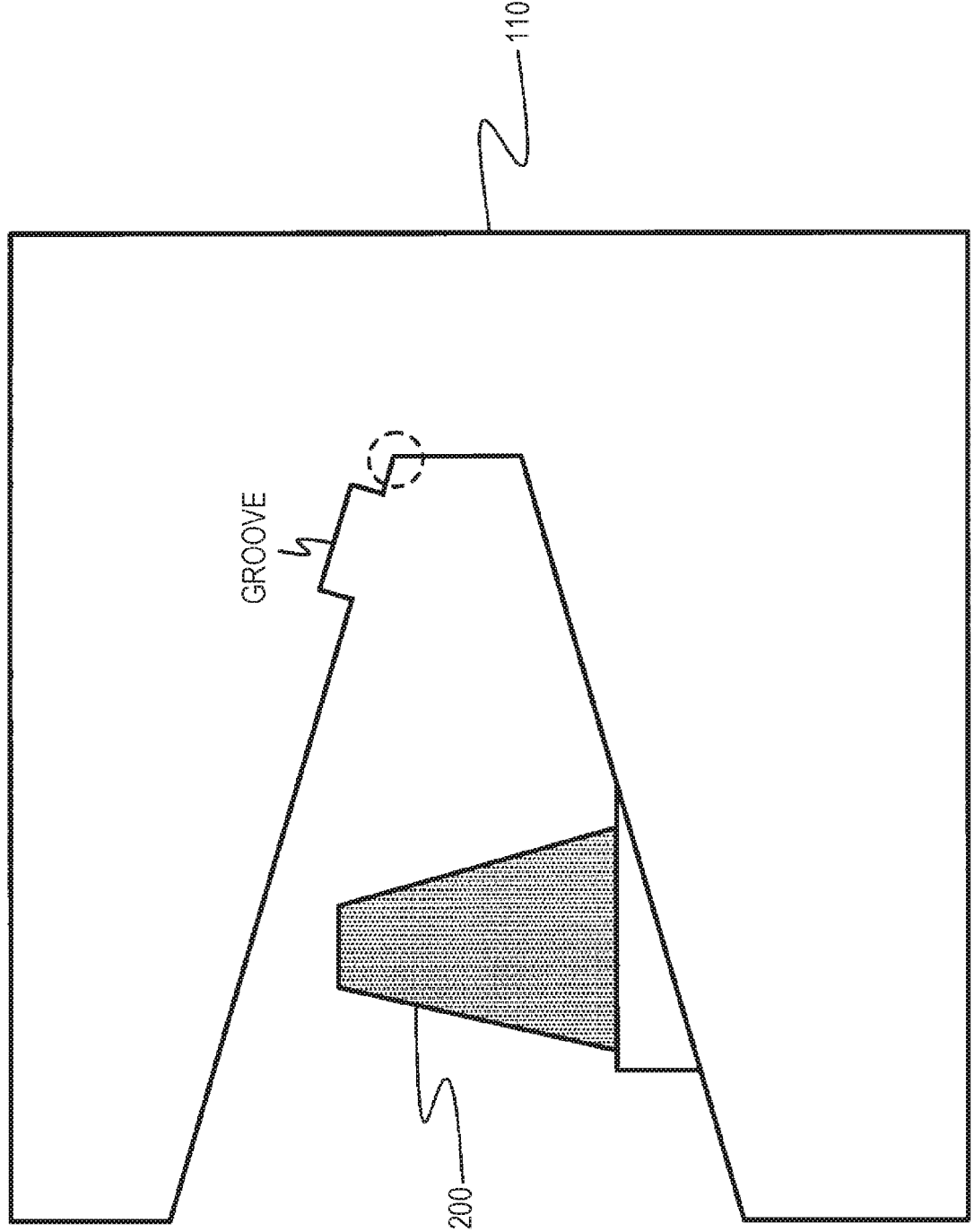

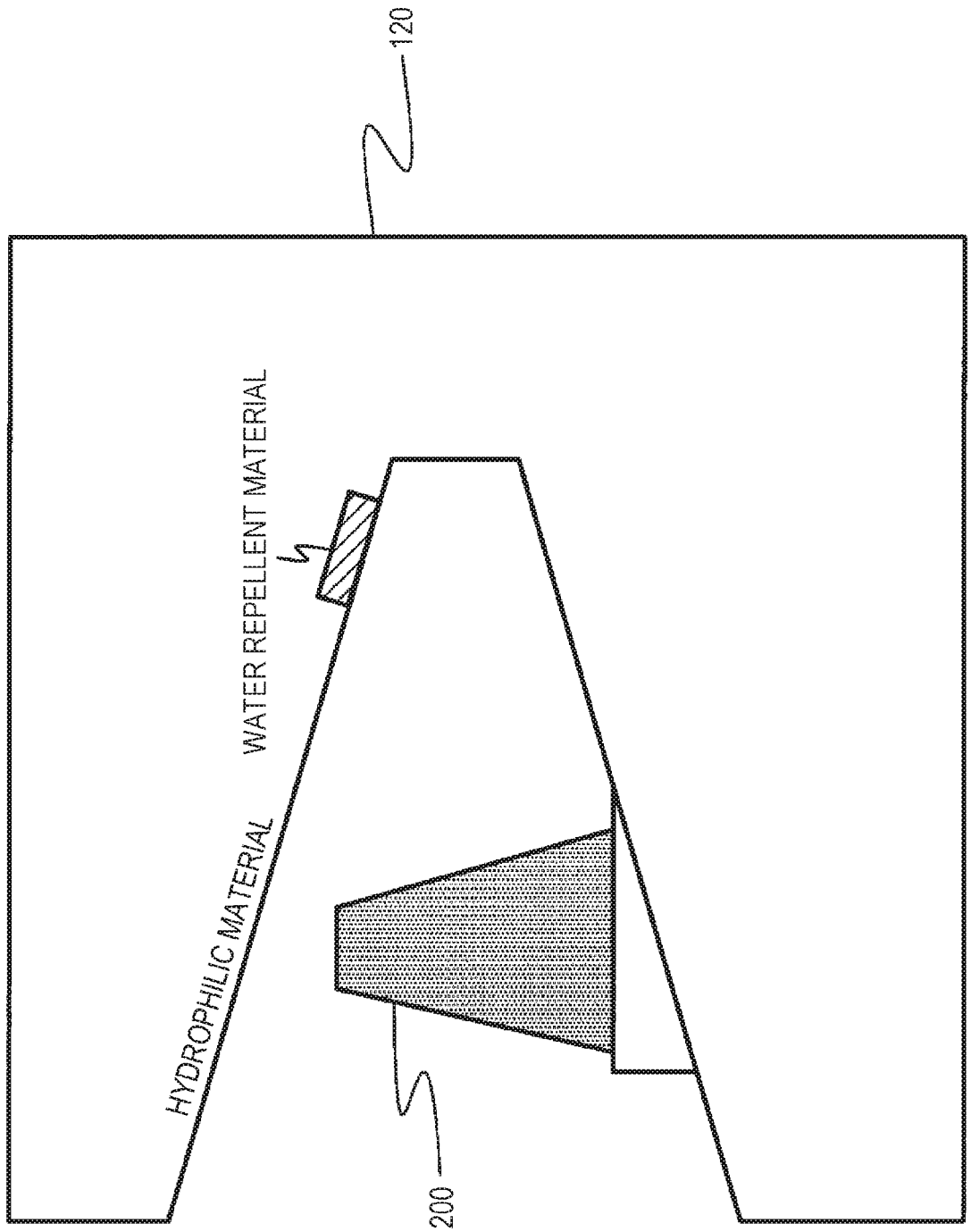

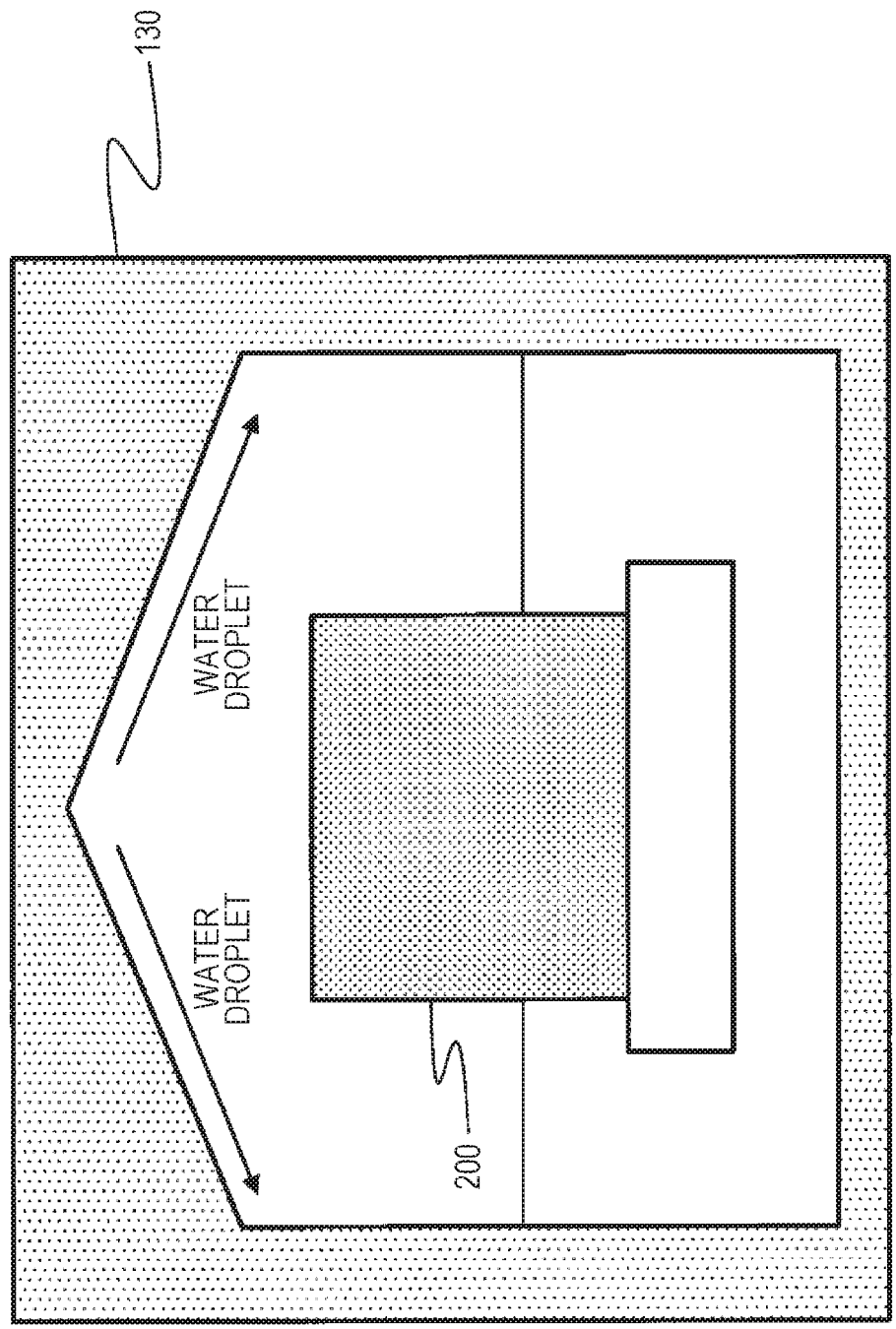

SENSOR HOUSING DEVICE

TECHNICAL FIELD

The present invention relates to a housing device for housing a housed item such as a sensor. The present invention particularly relates to a housing device of a LIDAR sensor.

BACKGROUND ART

In recent years, a technique for detecting a position, a size, and a shape of an object separated by a certain distance or more from a sensor using an optical sensor has been developed and a LIDAR sensor is one type thereof. A LIDAR is a technique of irradiating an object with a laser beam and measuring a reflected light generated by reflecting the irradiated laser on the object to measure a position, a size, and a shape of the object.

CITATION LIST

Patent Literature

PTL 1: Japanese Unexamined Patent Application Publication No. 2014-202527

SUMMARY OF INVENTION

Technical Problem

In order to perform measurement using a LIDAR sensor, in many cases, eaves are attached above the LIDAR sensor. However, in an example of the related art of the housing device of the LIDAR sensor, as illustrated in FIG. 1, if a water droplet caused by raindrops generated from the eaves during rainfall or the like crosses a scanned surface through which the laser beam passes or a light receiving area which receives the reflected light, there is a problem that the water droplet is irregularly reflected and erroneously detected as a measurement point. In relation to this, PTL 1 discloses a method of detecting a head position of a train by a distance sensor, performing processing to avoid erroneous detection due to rainfall with respect to distance data obtained from the distance sensor, and detecting the head position of the train, but the method does not prevent occurrence raindrop itself from the eaves. In addition, in the example of the related art described in FIG. 1, a phenomenon in which the water droplets dripping from a ceiling and being accumulated on a floor also occurs.

An object of the present invention is to provide a sensor housing device which reduces an occurrence frequency of water droplets dripping from a ceiling portion.

Solution to Problem

According to the present invention, there is provided a sensor housing device including: a casing of which at least one surface serves as an opening surface, in which when viewed from the opening surface, in order to convey a liquid flowing from above the opening surface to the depth side, a ceiling surface of the casing is inclined to descend from a front side to a depth side.

According to the present invention, there is provided a sensor housing device including: a casing of which at least one surface serves as an opening surface, in which when viewed from the opening surface, in order to convey a liquid flowing from above the opening surface to a depth side, in a ceiling portion of the casing, a contour of an end portion abutted on an opening includes a curved surface.

Advantageous Effects of Invention

According to the present invention, it is possible to reduce occurrence of water droplets dripping from eaves compared to the sensor housing device of the related art.

BRIEF DESCRIPTION OF DRAWINGS

FIG. 3 is a view illustrating a cross section of an end portion abutted on an opening of a ceiling portion included in the sensor housing device according to the first embodiment of the present invention.

FIG. 4 is a view illustrating a cross section of the sensor housing device in the depth direction according to the first embodiment of the present invention.

FIG. 5 is a view illustrating a cross section of a sensor housing device in a depth direction according to a second embodiment of the present invention.

FIG. 6 is a view illustrating a cross section of a sensor housing device in a depth direction according to a third embodiment of the present invention.

FIG. 7 is a view of a sensor housing device according to a fourth embodiment of the present invention as viewed from an opening portion side.

DESCRIPTION OF EMBODIMENTS

First Embodiment

An aspect of a sensor housing device according to a first embodiment of the present invention will be described in detail with reference to FIGS. 2 to 4. Moreover, a case where the sensor is a LIDAR sensor will be described, but the embodiment of the present invention is not limited thereto and can be applied to an arbitrary sensor.

Figure 1:
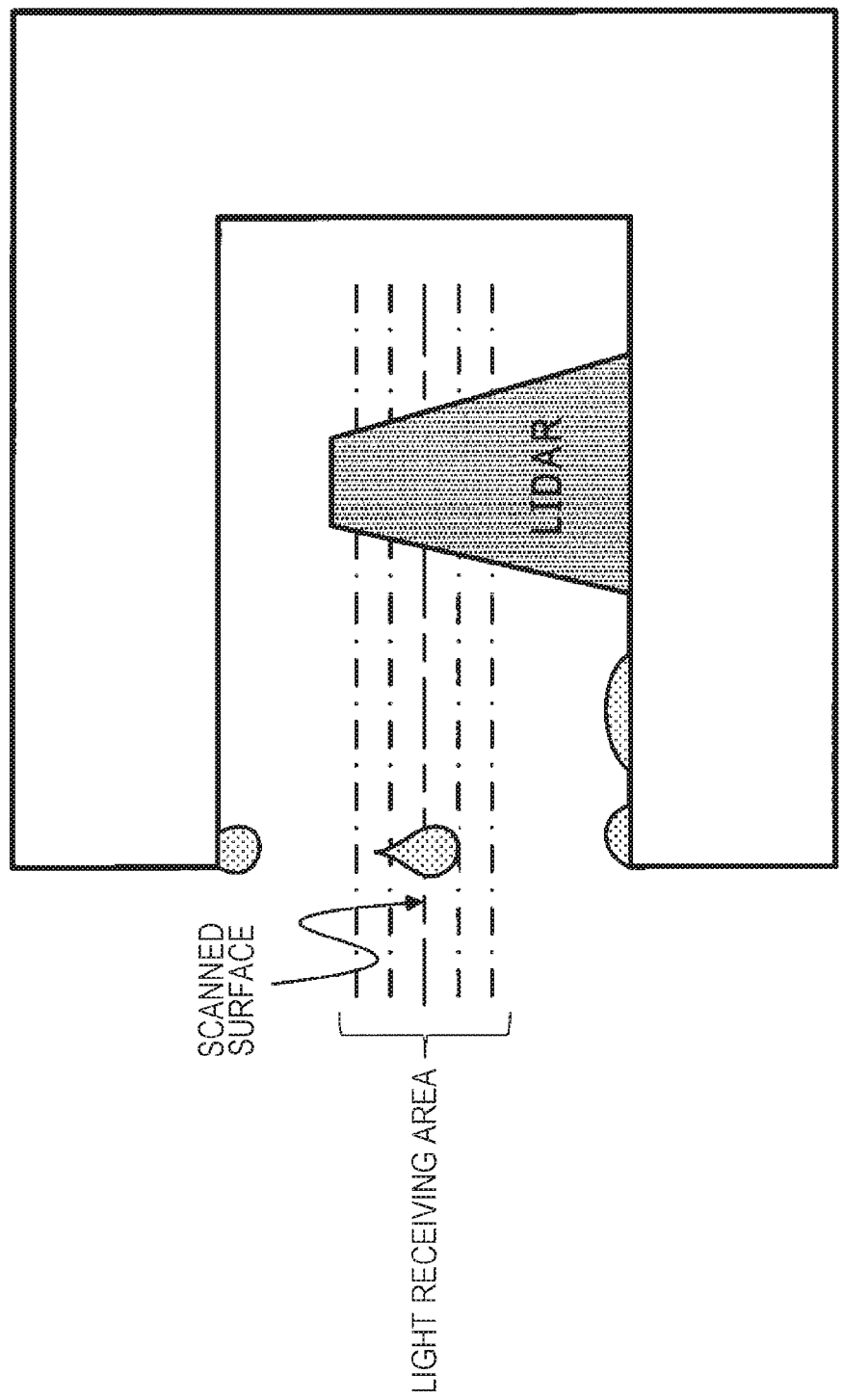
FIG. 1 is a view illustrating an example of the related art relating to a sensor housing device.
Figure 2:
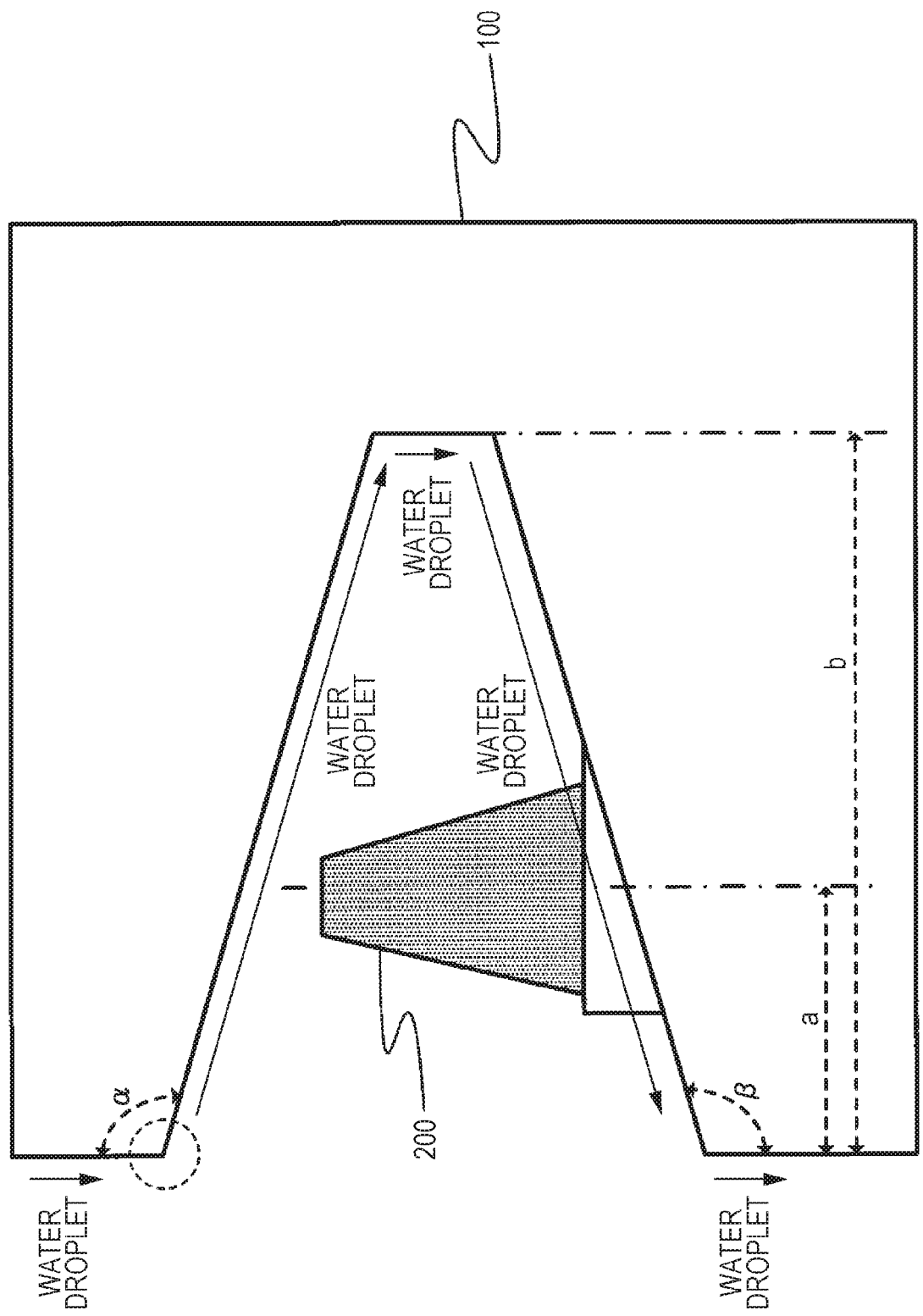
FIG. 2 is a view illustrating a cross section of a sensor housing device in a depth direction according to a first embodiment of the present invention.

FIG. 2 is a view illustrating a cross section of a sensor housing device 100 in a depth direction according to the first embodiment of the present invention. Compared to the example of the related art described in FIG. 1, a ceiling portion is inclined so as to descend from an opening surface side toward a depth side and a floor portion is inclined so as to descend from the depth side toward the opening surface side. That is, an angle α and an angle β described in FIG. 2 are obtuse angles.

At the same time, in FIG. 2, a distance a from the opening surface to a sensor 200 is a length or more that satisfies that direct sunlight does not hit the sensor 200.

As a specific numerical example, it is preferable that a shape of the sensor 200 is columnar or truncated conical, a height is 5 cm, a diameter of a bottom surface is 4 cm, both α and β are substantially 100°, a is substantially 10 to 15 cm, and b is substantially twice a. However, the embodiment of the present invention is not limited thereto.

In addition, the housing device of the present invention may be manufactured using, for example, ABS resin, but the embodiment of the present invention is not limited thereto.

Since the ceiling portion is inclined so as to descend from the opening portion side toward the depth side, unlike the example of the related art described in FIG. 1, a water droplet flowing from above the opening surface is conveyed to the ceiling surface to flow to the depth side without dripping at a corner of a ceiling end portion indicated by a dotted circle. Furthermore, even after the water reaches the floor portion by being conveyed downward a wall behind the sensor when viewing the opening surface from the sensor, since the floor portion is inclined so as to descend from the depth side to the opening surface side, the water flows to the opening surface side without being accumulated in the floor portion.

Moreover, an enlarged view of the ceiling end portion indicated by the dotted circle is illustrated in FIG. 3 and the end portion is removed and rounded. Therefore, a frequency that the water droplet flowing from above the opening surface is conveyed to the ceiling surface to flow to the depth side is further increased without dripping at the end portion.

In addition, FIG. 4 illustrates an appearance of the water droplets flowing through the floor portion and a lower end of the sensor is separated from the floor portion by at least 5 mm so that the water droplet does not overlap with a scanned surface or a light receiving area receiving a laser reflected light.

According to the first embodiment, it is possible to reduce an occurrence frequency of the water droplets dripping from the ceiling portion of the housing device and the water droplets accumulated on the floor as compared to the sensor housing device of the related art.

Moreover, with respect to the rounding of the ceiling end portion, in FIGS. 2 to 4 and the above description that describe the embodiment, an mode, in which the inclination of the ceiling and the rounding of the ceiling end portion are combined, is described, but as an alternative, a mode, in which the ceiling is not inclined and only the ceiling end portion is rounded, may be provided. It is possible to obtain the effect of increasing the frequency that the water droplet flowing from above the opening surface is conveyed to the ceiling surface to flow to the depth side without dripping at the ceiling end portion only by rounding the ceiling end portion.

Second Embodiment

An aspect of a sensor housing device according to a second embodiment of the present invention will be described in detail with reference to FIG. 5.

As illustrated in FIG. 5, in the second embodiment, when viewing the opening surface from the sensor, a drain groove extending in a width direction when viewed from the opening surface exists behind the sensor in the ceiling portion so that a longitudinal direction of the drain groove includes a component parallel to the opening surface. Therefore, the water conveyed on the ceiling portion from the opening surface side to the depth side is temporarily accumulated at the groove and then at least some of the accumulated water does not advance further and drips directly downward from the groove or flows along the longitudinal direction (width direction when viewed from the front) of the groove, and then flows downward through a side wall when viewed from the front.

Moreover, in the above description, the drain groove extends in the width direction when viewed from the opening surface. However, as long as at least a part of the water droplets entering the ceiling portion from the ceiling portion flows as described above, it may not be so.

For example, in a case where there is no such groove, the water is accumulated at a corner between the ceiling portion and a back wall indicated by a dotted circle in FIG. 5 and, for example, in a case where a sensor 200 and a sensor housing device 110 are used outdoors in winter, the water accumulated in the corner may freeze. The groove can reduce the occurrence frequency of such phenomenon.

Third Embodiment

An aspect of a sensor housing device according to a third embodiment of the present invention will be described in detail with reference to FIG. 6.

As described above, in the second embodiment, when viewing the opening surface from the sensor, the drain groove extending in the width direction when viewed from the opening surface exists behind the sensor in the ceiling portion so that the longitudinal direction includes the component parallel to the opening surface. On the other hand, in the third embodiment, instead of the groove or in addition to the groove, a region extending in the width direction when viewed from the opening surface exists so that the longitudinal direction thereof includes the component parallel to the opening surface so as to fill the groove. The region is a region manufactured from a water repellent material. Other regions may be manufactured from a hydrophilic material, but is not limited thereto. Other regions of the region may have water repellency which is weaker than water repellency of the region. However, it is preferable that a configuration in which the water droplet reaches the region is provided. A difference in water repellency may be provided by a structure of the surface. In the third embodiment, the water droplet reaching the region of the water repellent material drips downward or flows along the longitudinal direction (width direction when viewed from the front) of the region of the water repellent material, and then flows downward through the side wall when viewed from the front.

As a material of the water repellent region, a compound (fluorine-based resin (for example, polytetrafluoroethylene)) containing fluorine atoms can be used. As a material of the hydrophilic region, a compound containing no fluorine can be used and there are various kinds. As the material of the hydrophilic region, a water-soluble resin (for example, a cellulose resin, a polyvinyl alcohol resin, and a maleic anhydride resin), or a metal oxide (for example, titanium dioxide) can be used.

In addition, a "contact angle" is defined in relation to water repellency and the hydrophilicity (see https://en.wikipedia.org/wiki/Wetting). When a solid surface is in contact with a liquid and a gas, an angle formed by a liquid surface and a solid surface at a contacting boundary line of three phases is referred to as the contact angle and a state where the contact angle is 90° or less is referred to as getting wet. In addition, a property that the contact angle is small is referred to as hydrophilicity and a property that the contact angle is large is referred to as water repellency. In the embodiment, a case in which the other regions having the water repellency weaker than the water repellency of the relevant region or the relevant region has the water repellency and the other regions has the hydrophilicity means that the contact angle of the relevant region is larger than that of the other regions.

Therefore, the water droplet does not drip at the end portion abutted on an opening in the ceiling portion and a frequency of flow of water conveyed on the ceiling portion from the opening surface side to the depth side increases. At the same time, similar to the second embodiment, it is possible to reduce the occurrence frequency of the phenomenon that the water is accumulated at the corner between the ceiling portion and the wall behind the sensor.

Fourth Embodiment

A sensor housing device according to a fourth embodiment of the present invention will be described in detail with reference to FIG. 7.

As illustrated in FIG. 7, it is assumed a case where, for example, the sensor detects the light received from a certain direction and at the same time, does not detect light from a direction orthogonal to the direction, and a wall exists in the orthogonal direction. In such a case, the ceiling portion of the housing device is made into a mountain shape, so that the water droplet existing at each portion of a boundary side between the ceiling portion and a front wall is conveyed to the boundary side or a vicinity thereof, thereby capable of flowing in the orthogonal direction. Therefore, it is possible to reduce the occurrence frequency of the phenomenon that the water droplet drips on the front surface of the sensor that is the housed item.

Fifth Embodiment

A sensor housing device according to a fifth embodiment of the present invention will be described in detail with reference to FIGS. 8A and 8B.

Figure 8A:
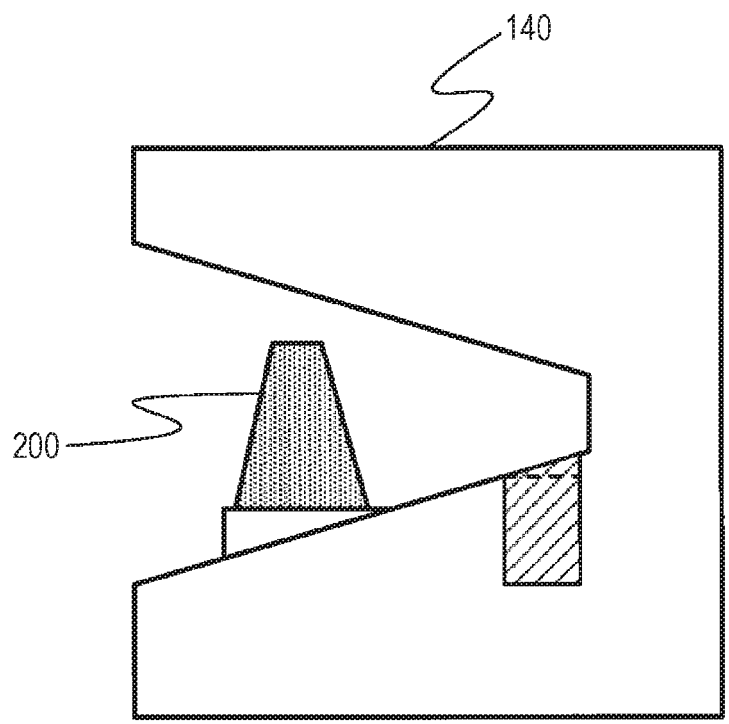
FIG. 8A is a view illustrating a side sectional view of a sensor housing device according to a fifth embodiment of the present invention.

As illustrated in FIG. 8A, in the fifth embodiment, when viewing the opening surface from the sensor, the drain groove extending in the width direction when viewed from the opening surface exists behind the sensor in the floor portion so that the longitudinal direction includes the component parallel to the opening surface. Therefore, the water conveyed on the ceiling to flow behind the sensor, and conveyed on the wall behind the sensor to flow downward, or the water dripping from the groove of the ceiling portion in the second embodiment and from the region of the ceiling portion manufactured by the water repellent material in the third embodiment enters the drain groove, and when viewing the sensor from the opening surface side, the water can be discharged to both sides of the housing device.

Figure 8B:
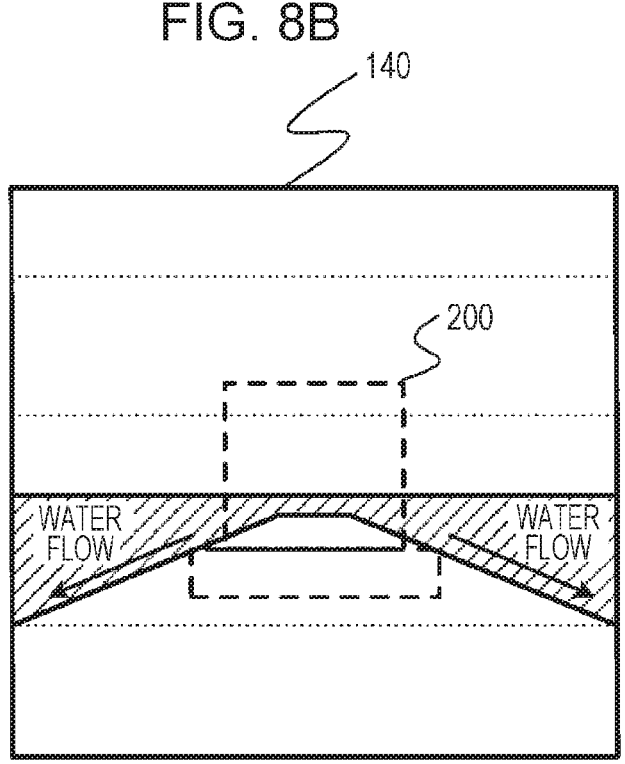
FIG. 8B is a view illustrating a front sectional view of a drain groove of the sensor housing device according to the fifth embodiment of the present invention.

Here, as illustrated in FIG. 8B, a bottom surface of the drain groove is inclined so as to descend from the center portion in a drainage direction, so that the water can be easily discharged laterally.

Moreover, as long as a front view of a sensor 200 is not obstructed, the water accumulated below the drain groove may be discharged to an outside with a structure which is properly provided. For example, the water may be discharged to the outside from a through-hole connecting a discharge port and the outside.

Sixth Embodiment

Figure 9A:
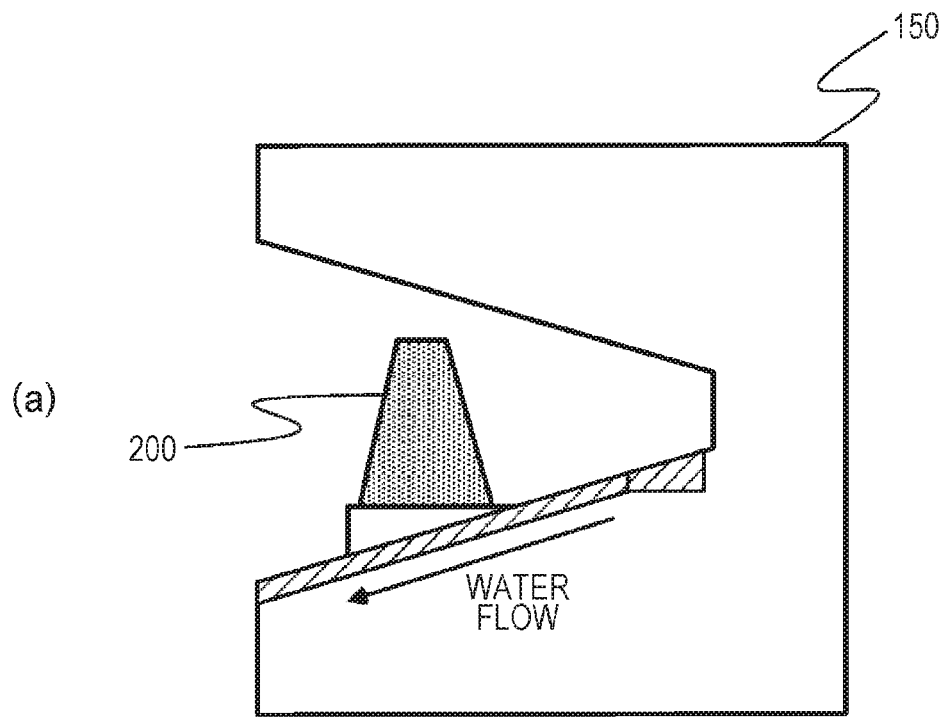
FIG. 9A is a top view of a side sectional view of a sensor housing device according to a sixth embodiment of the present invention.
Figure 9B:
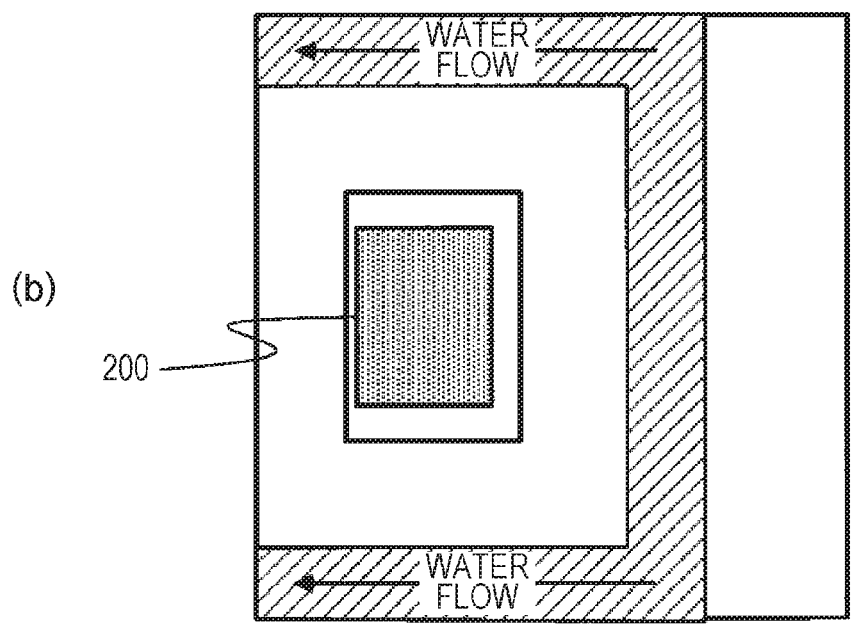
FIG. 9B is a top view of a drain groove of the sensor housing device according to the sixth embodiment of the present invention.

A sensor housing device according to a sixth embodiment of the present invention will be described in detail with reference to FIGS. 9A and 9B. FIG. 9A is a side sectional view of a sensor housing device, in particular, a drain groove according to the sixth embodiment of the present invention. FIG. 9B is a top view of the drain groove.

As illustrated in FIG. 9B, in the sixth embodiment, in addition to the drain groove in the direction parallel to the opening surface, when viewed from the opening surface, grooves in the depth direction exist both right and left ends of the floor portion. Therefore, the water accumulated in the drain groove in the direction parallel to the opening surface can be discharged to the opening surface side through the grooves in the depth direction.

Seventh and Eighth Embodiments

A sensor housing device according to a seventh and eighth embodiments of the present invention will be described in detail with reference to FIGS. 10A and 10B.

Figure 10A:
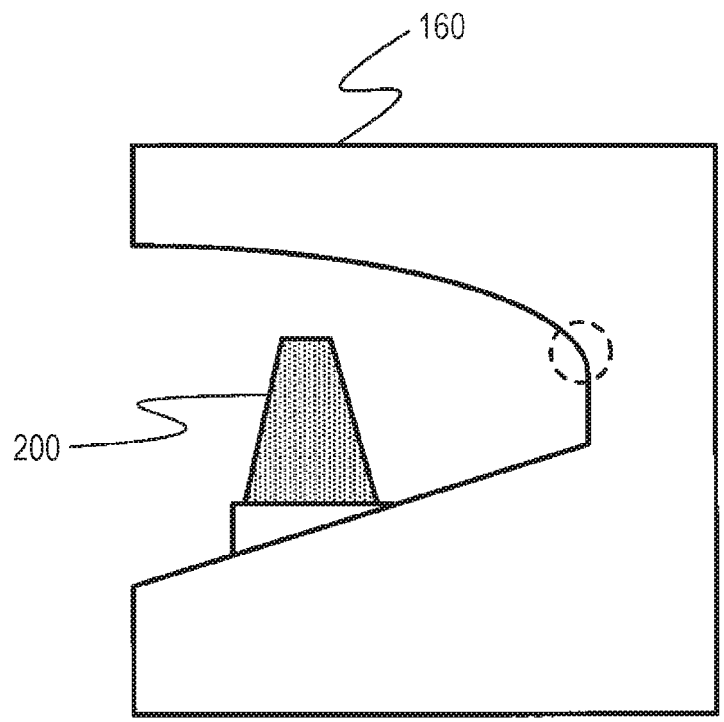
FIG. 10A is a view illustrating a side sectional view of a sensor housing device according to a seventh embodiment.

As illustrated in FIG. 10A, in the seventh embodiment, the ceiling portion includes a curved surface. In addition, as illustrated in FIG. 10B, in the eighth embodiment, an inclination degree of the ceiling portion changes stepwise. It is also possible to adopt such a form depending on a use environment of the sensor and the sensor housing device. Particularly, even if a deepest portion of the ceiling portion is continuously connected to a deepest wall or is connected at an angle, it is possible to reduce the occurrence frequency of the phenomenon that the water is accumulated in a region in a circle indicated by dotted lines in FIGS. 10A and 10B by being connected at an internal angle close to 180°.

Figure 10B:
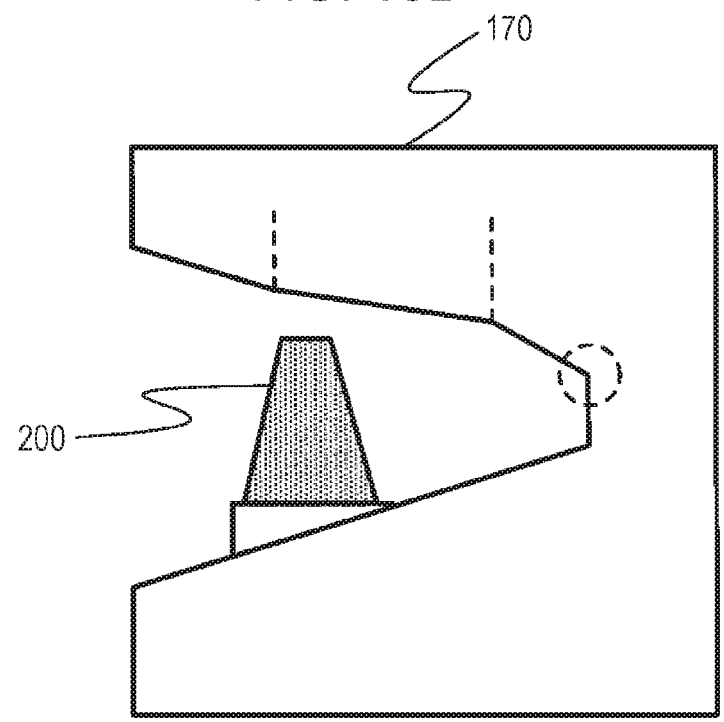
FIG. 10B is a view illustrating a side sectional view of a sensor housing device according to an eighth embodiment.

In addition, although not illustrated, similar to the ceiling portions in FIGS. 10A and 10B, the curved surface may be provided or the inclination degree of the floor portion may change stepwise.

The first to eighth embodiments described above may be carried out alone or in combination of two or more embodiments. In addition, the above description, it is assumed that the water drips from above the opening surface, but even in a case where any liquid other than the water drips, the above embodiments can be applied.

Ninth Embodiment

Figure 11:
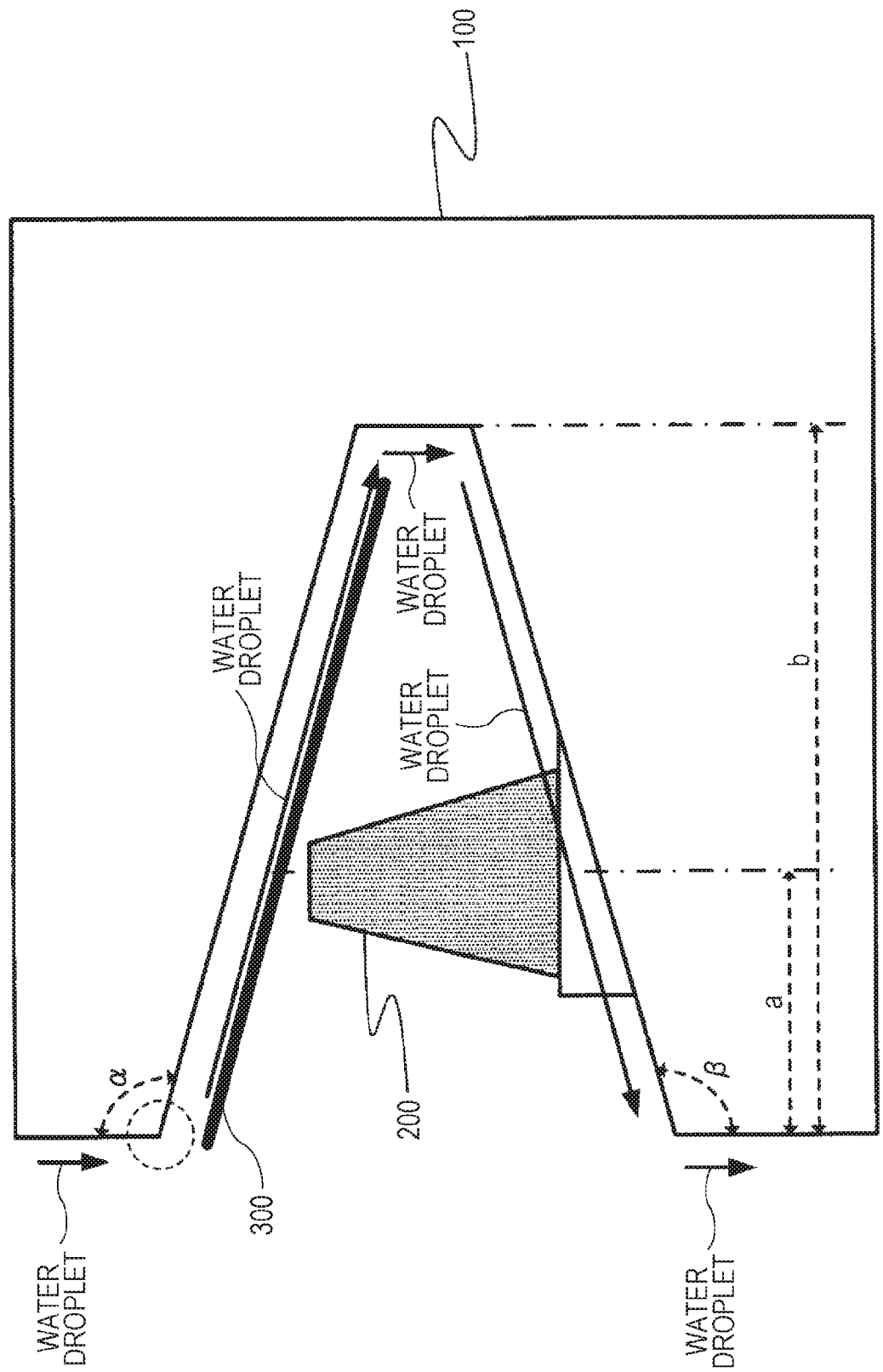
FIG. 11 is a view illustrating a side sectional view of a housing device according to a ninth embodiment.
Figure 12:
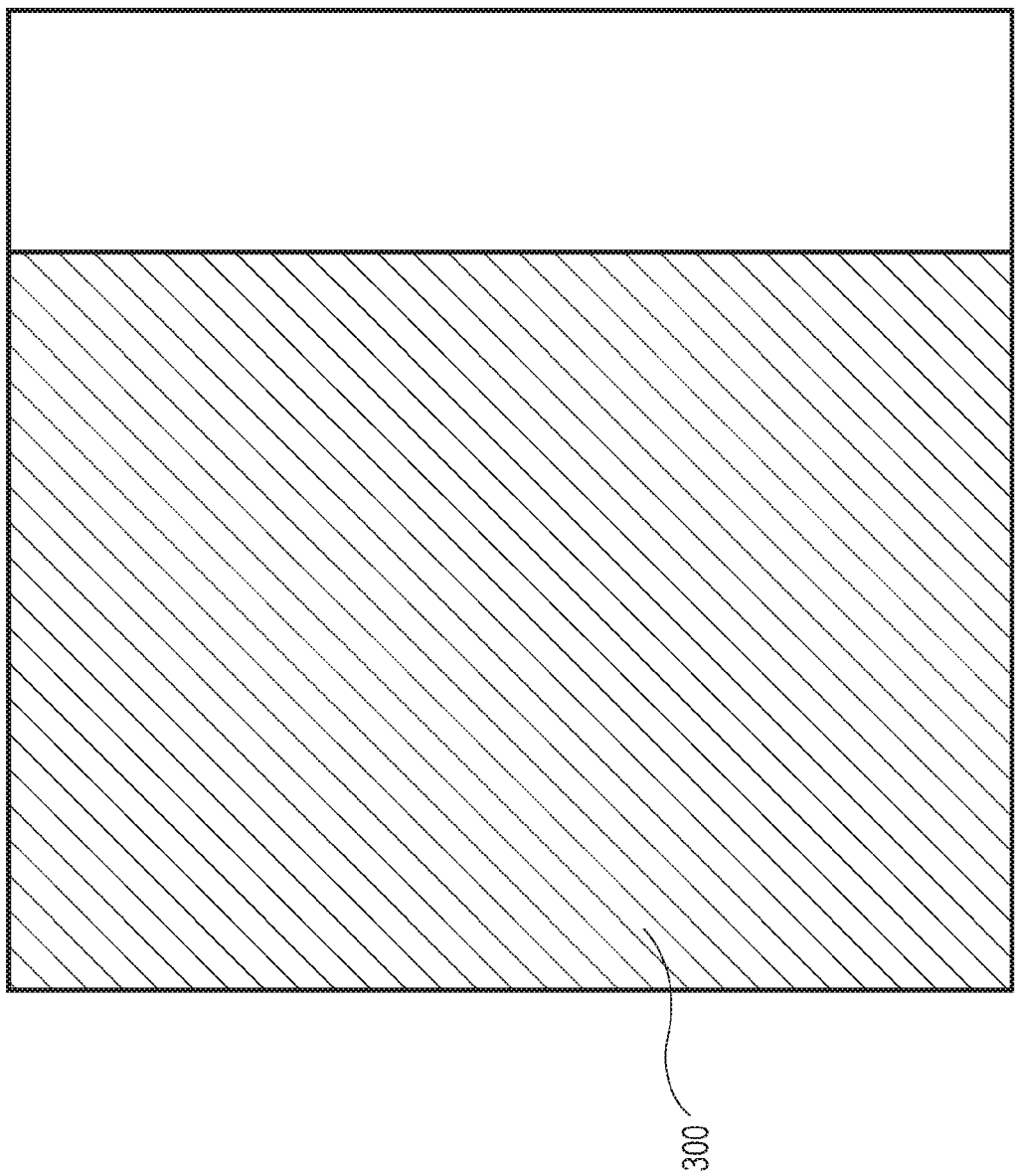
FIG. 12 is a view illustrating a plan view or the like of a gutter of the housing device according to the ninth embodiment.

In a ninth embodiment, as illustrated in FIGS. 11 and 12, a gutter 300 is provided between the ceiling and a sensor 200. In the example of FIGS. 11 and 12, the gutter 300 covers a ceiling front surface from below with a predetermined distance from the ceiling. Therefore, when the sensor 200 is placed at a viewpoint, the ceiling is hidden behind the gutter 300 so that it cannot be seen. Such a gutter is provided, so that even if the water droplet entering the ceiling from a boundary between the ceiling and the front wall falls while being conveyed on the ceiling and advancing to the deepest wall, the gutter 300 receives the water droplet. The water droplet received by the gutter 300 reaches the deepest wall through the gutter 300. Thereafter, the water droplet moves from the deepest wall to the floor surface and then is conveyed to the floor surface to move to the front wall. The water droplet moved to the front wall is conveyed to the front wall and falls downward.

Therefore, the gutter 300 is provided, so that even if the water droplet falls from the ceiling, the water droplet does not fall on the sensor 200.

The gutter 300 may be hung from the ceiling or may be attached to both side surfaces so as to connect the both side surfaces when viewed from the floor surface.

The gutter 300 does not need to cover the entire surface of the ceiling from below as long as the above effect is achieved. For example, the gutter 300 may cover a part (particularly, a range from an entrance to a vicinity of the upper surface of the sensor 200) of the ceiling.

EXAMPLE

Figure 13:
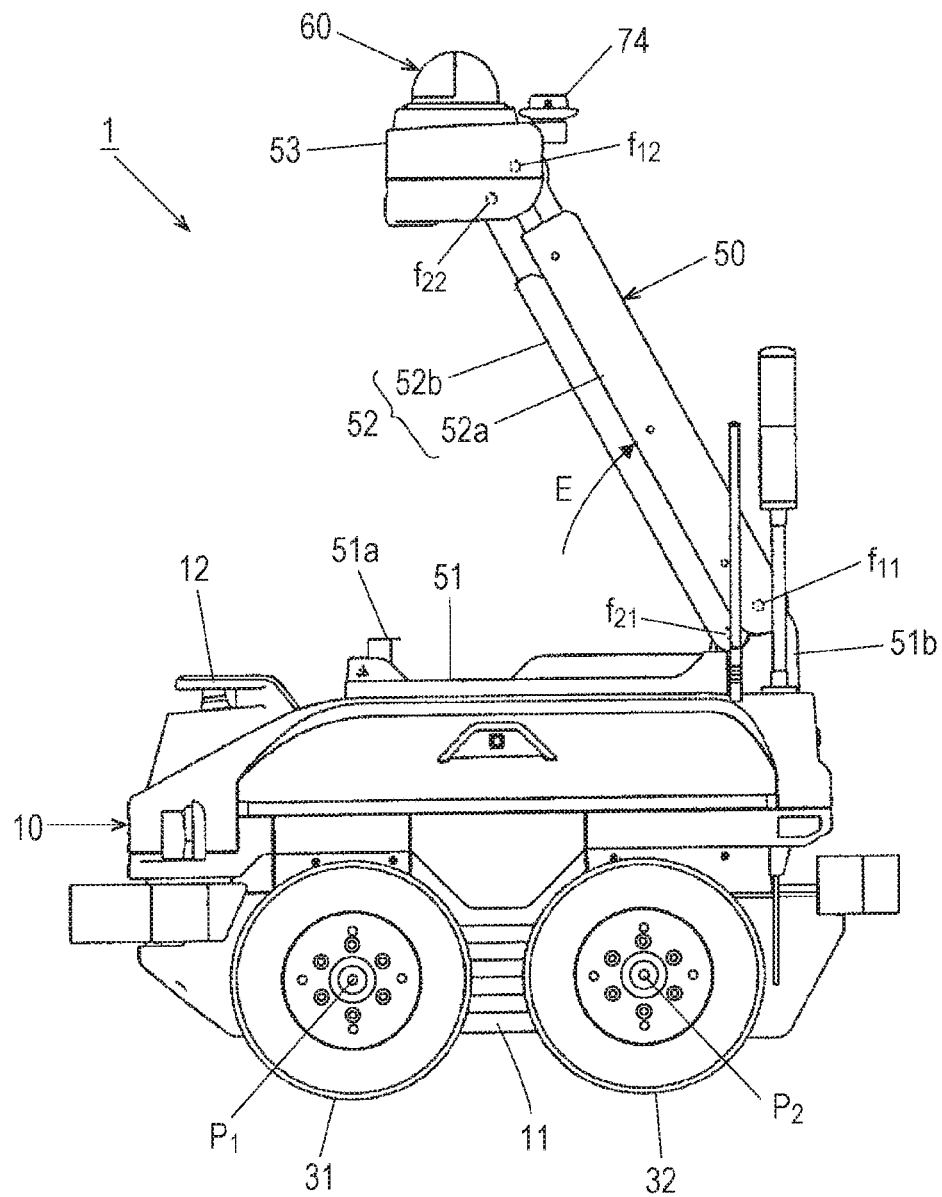
FIG. 13 is a view illustrating an example of a self-propelled robot including the sensor housing device according to the embodiment of the present invention.

FIG. 13 is a view illustrating an example of a self-propelled robot 1 including the sensor housing device according to the embodiment of the present invention.

As illustrated in FIG. 13, the self-propelled robot 1 includes an electric chassis portion 10 and an elevating mechanism unit 50 provided on the electric chassis portion 10.

The electric chassis portion 10 includes a chassis body 11, front wheels 31 and rear wheels 32 provided at front and rear, and right and left of the chassis body 11, and a distance detection unit 12 is provided on a front end portion of the chassis body 11.

The elevating mechanism unit 50 includes an underframe 51 (including a support portion 51a and a pivotal portion 51b) which is fixed to the chassis body 11, a swingable boom 52 (including main frame 52a and a balancing portion supporting rod 52b) provided at the pivotal portion 51b of the underframe 51, and a balancing portion 53 provided at a tip of the boom, and the balancing portion 53 includes an imaging unit 60 and a GPS antenna 74. Here, the balancing portion 53 is a balancing device that maintains normal postures of the imaging unit 60 and GPS antenna 74 even if the boom 52 swings.

The sensor housing device of the present invention can be used as a casing configuring the distance detection unit 12.

In addition, the housing device housing the sensor according to the present invention can be used not only for the self-propelled robot but also, for example, for a fixed point camera such as a surveillance camera used outdoors or a portable camera.

INDUSTRIAL APPLICABILITY

The present invention is not limited to a sensor that detects electromagnetic waves (including light), sound waves, or the like from the outside or radiates these to the outside, and can be used as a housing device that houses any housed item.

REFERENCE SIGNS LIST 1 self-propelled robot
10 electric chassis portion
11 chassis body
12 distance detection unit
31 front wheel
32 rear wheel
50 elevating mechanism unit
51 underframe
51a support portion
51b pivotal portion
52 boom
52a main frame
52b balancing portion supporting rod
53 balancing portion
60 imaging unit
74 GPS antenna
100 housing device
110 housing device
120 housing device
130 housing device
140 housing device
150 housing device
160 housing device
170 housing device
200 sensor

The invention claimed is:

1. A sensor housing device comprising:
a casing of which at least one surface serves as an opening surface,
wherein when viewed from the opening surface, in order to convey a liquid flowing from above the opening surface to the depth side, a ceiling surface of the casing is inclined to descend from a front side to a depth side, and
in a ceiling portion of the casing, a contour of an end portion abutted on an opening includes a curved surface.

2. The housing device according to claim 1,
wherein a ceiling portion of the casing includes a curved surface.

3. The housing device according to claim 1,
wherein an inclination degree of a ceiling portion of the casing changes stepwise or continuously.

4. A sensor housing device comprising:
a casing of which at least one surface serves as an opening surface,
wherein when viewed from the opening surface, in order to convey a liquid flowing from above the opening surface to a depth side, in a ceiling portion of the casing, a contour of an end portion abutted on an opening includes a curved surface.

5. The housing device according to claim 1,
wherein when viewed from the opening surface, in order to cause a liquid to flow from a floor portion of the casing to the front side, the floor portion is inclined to descend from the depth side toward the front side.

6. The housing device according to claim 5,
wherein an inclination degree of the floor portion of the casing changes stepwise or continuously.

7. The housing device according to claim 5,
wherein the floor portion of the casing includes a curved surface.

8. The housing device according to claim 1,
wherein when viewing the opening surface from the housed item, in the ceiling portion, a groove exists behind the housed item.

9. The housing device according to claim 1,
wherein when viewing the opening surface from the housed item, in the ceiling portion, in a case where a liquid droplet is in contact with a surface in the air, a region in which a contact angle of the liquid droplet is larger than that in a region on a front side of the housed item exists behind the housed item.

10. The housing device according to claim 1, wherein when viewing the opening surface from the housed item, in the floor portion, a drain groove exists behind the housed item.

11. A sensor housing device comprising:
a casing of which at east one surface serves as an opening surface,
wherein when viewed from the opening surface, in order to convey a liquid flowing from above the opening surface to the depth side, a ceiling surface of the casing is inclined to descend from a front side to a depth side,
when viewing the opening surface from the housed item, in the floor portion, a drain groove exists behind the housed item, and
a bottom surface of the drain groove is inclined downward from a center portion toward a drainage destination.

12. The housing device according to claim 10, wherein when viewed from the opening surface, a groove extending in a depth direction exists at both right and left ends of the floor portion.

13. The housing device according to claim 1, wherein when viewed from the opening surface, the ceiling portion has a mountain shape.

14. The housing device according to claim 1, wherein a gutter is provided between the ceiling portion and a housed item.

15. The housing device according to claim 1, wherein the housed item is a LIDAR sensor.

16. A traveling apparatus comprising:
the housing device according to claim 1.

* * * * *